(12) United States Patent
Vemula et al.

(10) Patent No.: US 7,953,877 B2
(45) Date of Patent: May 31, 2011

(54) SYSTEM AND METHOD FOR CONTROLLING DATA FLOW BASED UPON A TEMPORAL POLICY

(75) Inventors: Narendra Vemula, Fremont, CA (US);
Jan Thomas Svensson, Oakland, CA (US); Anders Lars-Goran Forsberg, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 657 days.

(21) Appl. No.: 11/434,022

(22) Filed: May 15, 2006

(65) Prior Publication Data
US 2007/0106808 A1 May 10, 2007

(51) Int. Cl.
G06F 15/173 (2006.01)
G06F 15/16 (2006.01)
(52) U.S. Cl. .......... 709/230; 709/223; 709/224; 370/338
(58) Field of Classification Search .................. 709/220, 709/230, 310, 223–226; 370/230.1, 352; 455/466
See application file for complete search history.

(56) References Cited

U.S. PATENT DOCUMENTS

| | | | |
|---|---|---|---|
| 5,440,727 A | 8/1995 | Bhide et al. | |
| 5,659,596 A | 8/1997 | Dunn | |
| 5,963,974 A | 10/1999 | Arimilli et al. | |
| 6,052,724 A | 4/2000 | Willie et al. | |
| 6,067,301 A | 5/2000 | Aatresh | |
| 6,134,673 A | 10/2000 | Chrabaszcz | |
| 6,208,870 B1 | 3/2001 | Lorello et al. | |
| 6,226,686 B1 | 5/2001 | Rothschild et al. | |
| 6,279,076 B1 | 8/2001 | Shishido et al. | |
| 6,292,833 B1 | 9/2001 | Liao et al. | |
| 6,304,949 B1 | 10/2001 | Houlsdworth | |
| 6,480,862 B1 | 11/2002 | Gall | |
| 6,578,076 B1 * | 6/2003 | Putzolu | 709/223 |
| 6,611,867 B1 | 8/2003 | Bowman-Amuah | |
| 6,621,793 B2 * | 9/2003 | Widegren et al. | 370/230.1 |
| 6,625,751 B1 | 9/2003 | Starovic et al. | |
| 6,629,260 B1 | 9/2003 | Dancer et al. | |
| 6,701,519 B1 | 3/2004 | Cowan | |
| 6,704,933 B1 | 3/2004 | Tanaka et al. | |
| 6,708,206 B1 | 3/2004 | Thrane et al. | |
| 6,721,286 B1 | 4/2004 | Williams et al. | |
| 6,747,970 B1 | 6/2004 | Lamb et al. | |
| 6,823,477 B1 | 11/2004 | Cheng et al. | |
| 6,862,689 B2 | 3/2005 | Bergsten et al. | |

(Continued)

OTHER PUBLICATIONS

Wei Zhuang et al, Policy Based QoS Architecture in the IP Multimedia Subsystem of UMTS, IEEE Network, May/Jun. 2003, pp. 51-57.*

(Continued)

*Primary Examiner* — Ian N Moore
*Assistant Examiner* — Thai N Nguyen
(74) *Attorney, Agent, or Firm* — Fliesler Meyer LLP

(57) ABSTRACT

In accordance with embodiments, there are provided mechanisms and methods for controlling data flow based on a temporal policy. These mechanisms and methods for controlling data flow based on a temporal policy can enable embodiments to provide a different service level agreement to control network traffic selected from a plurality of service level agreements based upon one or more temporal conditions. The ability of embodiments to provide different service level agreement to control network traffic can enable embodiments to control one or more of access to network resources and traffic flow coordination to enhance efficient usage of the network resources.

8 Claims, 7 Drawing Sheets

U.S. PATENT DOCUMENTS

| | | | |
|---|---|---|---|
| 6,888,828 B1 | 5/2005 | Partanen et al. | |
| 6,961,776 B1 | 11/2005 | Buckingham et al. | |
| 6,965,777 B1 | 11/2005 | Cast et al. | |
| 6,988,133 B1* | 1/2006 | Zavalkovsky et al. | 709/223 |
| 7,039,037 B2 | 5/2006 | Wang et al. | |
| 7,050,424 B2 | 5/2006 | Cheng et al. | |
| 7,058,046 B2 | 6/2006 | Celi, Jr. et al. | |
| 7,076,562 B2 | 7/2006 | Singhal et al. | |
| 7,082,102 B1* | 7/2006 | Wright | 370/229 |
| 7,089,307 B2 | 8/2006 | Zintel et al. | |
| 7,142,876 B2 | 11/2006 | Trossen et al. | |
| 7,283,539 B2 | 10/2007 | Wang et al. | |
| 7,301,905 B1 | 11/2007 | Tontiruttananon et al. | |
| 7,380,073 B2 | 5/2008 | Shorb | |
| 7,392,421 B1 | 6/2008 | Bloomstein et al. | |
| 7,464,178 B2* | 12/2008 | Corrigan et al. | 709/238 |
| 7,506,194 B2 | 3/2009 | Appanna et al. | |
| 2001/0030970 A1* | 10/2001 | Wiryaman et al. | 370/401 |
| 2002/0036983 A1* | 3/2002 | Widegren et al. | 370/230.1 |
| 2002/0039352 A1 | 4/2002 | El-Fekih et al. | |
| 2002/0048269 A1 | 4/2002 | Hong et al. | |
| 2002/0065034 A1 | 5/2002 | Zhang | |
| 2002/0073404 A1 | 6/2002 | Sokolov et al. | |
| 2002/0075844 A1 | 6/2002 | Hagen | |
| 2002/0077134 A1* | 6/2002 | Mizell et al. | 455/466 |
| 2002/0129174 A1* | 9/2002 | LaBaw | 709/310 |
| 2002/0144119 A1 | 10/2002 | Benantar | |
| 2002/0147749 A1 | 10/2002 | Ortiz et al. | |
| 2002/0159387 A1 | 10/2002 | Allison et al. | |
| 2003/0033524 A1 | 2/2003 | Tran et al. | |
| 2003/0055920 A1* | 3/2003 | Kakadia et al. | 709/220 |
| 2003/0093695 A1 | 5/2003 | Dutta | |
| 2003/0095540 A1* | 5/2003 | Mulligan et al. | 370/352 |
| 2003/0120593 A1 | 6/2003 | Bansal et al. | |
| 2003/0125021 A1 | 7/2003 | Tell et al. | |
| 2003/0131116 A1* | 7/2003 | Jain et al. | 709/230 |
| 2003/0158908 A1 | 8/2003 | Jacobs et al. | |
| 2003/0227894 A1 | 12/2003 | Wang et al. | |
| 2003/0227926 A1 | 12/2003 | Ramamurthy et al. | |
| 2004/0002881 A1 | 1/2004 | Hu et al. | |
| 2004/0116117 A1 | 6/2004 | Ahvonen et al. | |
| 2004/0117794 A1 | 6/2004 | Kundu | |
| 2004/0139204 A1 | 7/2004 | Ergezinger et al. | |
| 2004/0148357 A1 | 7/2004 | Corrigan et al. | |
| 2004/0160911 A1 | 8/2004 | Zilliacus et al. | |
| 2004/0168162 A1 | 8/2004 | Park et al. | |
| 2004/0196858 A1* | 10/2004 | Tsai et al. | 370/401 |
| 2004/0213156 A1 | 10/2004 | Smallwood et al. | |
| 2004/0218619 A1 | 11/2004 | Salo | |
| 2004/0223602 A1 | 11/2004 | Honkasalo et al. | |
| 2004/0230682 A1 | 11/2004 | Immonen | |
| 2004/0246822 A1 | 12/2004 | Wong | |
| 2004/0246947 A1 | 12/2004 | Wong | |
| 2004/0258238 A1 | 12/2004 | Wong | |
| 2004/0260967 A1 | 12/2004 | Guha et al. | |
| 2004/0267882 A1 | 12/2004 | Whynot et al. | |
| 2005/0005022 A1* | 1/2005 | Taylor | 709/236 |
| 2005/0022047 A1 | 1/2005 | Chandrasekaran | |
| 2005/0022210 A1 | 1/2005 | Zintel et al. | |
| 2005/0025050 A1 | 2/2005 | Roeder | |
| 2005/0044188 A1 | 2/2005 | Nakazawa et al. | |
| 2005/0044233 A1 | 2/2005 | Cai et al. | |
| 2005/0091362 A1 | 4/2005 | Shigeta et al. | |
| 2005/0097367 A1 | 5/2005 | Nakazawa et al. | |
| 2005/0117576 A1 | 6/2005 | McDysan et al. | |
| 2005/0117602 A1 | 6/2005 | Carrigan et al. | |
| 2005/0152336 A1 | 7/2005 | Bratt et al. | |
| 2005/0185661 A1 | 8/2005 | Scott et al. | |
| 2005/0203962 A1 | 9/2005 | Zhou et al. | |
| 2005/0203994 A1 | 9/2005 | Palmer et al. | |
| 2005/0207432 A1 | 9/2005 | Velez-Rivera et al. | |
| 2005/0226225 A1 | 10/2005 | Shigeta | |
| 2005/0237999 A1 | 10/2005 | Shores et al. | |
| 2005/0259806 A1 | 11/2005 | Chang | |
| 2005/0265276 A1 | 12/2005 | Takeda et al. | |
| 2006/0002333 A1* | 1/2006 | Skog et al. | 370/328 |
| 2006/0010224 A1 | 1/2006 | Sekar et al. | |
| 2006/0069776 A1 | 3/2006 | Shim et al. | |
| 2006/0109818 A1 | 5/2006 | Ramanna et al. | |
| 2006/0128409 A1* | 6/2006 | Gress et al. | 455/466 |
| 2006/0174271 A1 | 8/2006 | Chen et al. | |
| 2006/0225108 A1 | 10/2006 | Tabassi et al. | |
| 2007/0005766 A1 | 1/2007 | Singhal et al. | |
| 2007/0011617 A1 | 1/2007 | Akagawa et al. | |
| 2007/0195779 A1* | 8/2007 | Judge et al. | 370/392 |
| 2007/0208862 A1 | 9/2007 | Fox et al. | |
| 2008/0021939 A1 | 1/2008 | Dahlstedt et al. | |
| 2008/0126832 A1 | 5/2008 | Morosan et al. | |
| 2008/0256257 A1 | 10/2008 | Miller et al. | |

OTHER PUBLICATIONS

International Search Report and Written Opinion for PCT/US07/69021 dated Jul. 25, 2008, 10 pages.

International Search Report and Written Opinion for PCT/US06/11429 dated mailed Aug. 7, 2007, 6 pages.

International Search Report and Written Opinion for PCT/US06/11165 dated Oct. 22, 2007 (7 pages).

Kristensen, A., "SIP Servlet API Version 1.0," Internet article [online], Feb. 4, 2003, http://jcp.org/en/Jsr/detail?id=116> [retrieved on Mar. 6, 2009], p. 1—section 1, p. 4—section 1.4.2.

O'Doherty, P. et al., "SIP and the Java Platforms," Internet article [online], Jun. 2003, Sun Microsystems homepage, http://java.sun.com/products/jain/SIP-and-Java.html> [retrieved on Mar. 6, 2009], sections 1, 2.2, 4, 6.

BEA Systems, Inc., BEA WebLogic SIP Server: Configuring and Managing WebLogic SIP Server, Dec. 2, 2005, BEA Systems, Inc., Version 2.1, pp. 4-13.

Coward et al., Java Servlet Specification v2.4, Nov. 24, 2003, pp. 1-330.

Kristensen et al., SIP Servlet API v1.0, Feb. 4, 2003, pp. 2-3, 5-120.

Rosenberg et al., Best Current Practices for Third Party Call Control in the SIP, Apr. 2004, Network Working Group, RFC 3725, pp. 1-32.

Fasel et al., "The FOKUS Open SIP AS—A Service Platform for NGN," Mar. 2005, IN Proceedings Kommunikation in Verteilten Systemen (KiVS), pp. 49-56.

Olsen et al., "SIP Servlet Discussion," 2003, org.apache.tomcat.dev listserv archives; pp. 1-5, retrieved at http://markmail.org/search/?q=sip+servlet+httpsession+date%3A199811-200605 on Nov. 3, 2010.

Magedanz et al., The IMS Playground @ FOKUS—An Open Testbed for Generation Network Multimedia Services, Feb. 23-25, 2005, pp. 1, 6.

* cited by examiner

SYSTEM AND METHOD FOR CONTROLLING DATA FLOW BASED UPON A TEMPORAL POLICY

CROSS REFERENCE TO RELATED APPLICATIONS

The following commonly owned, United States Patents and Patent Applications, including the present application, are related to each other. Each of the other patents/applications are incorporated by reference herein in their entirety:

U.S. patent application Ser. No. 11/378,188, entitled SYSTEM AND METHOD FOR MANAGING COMMUNICATIONS SESSIONS IN A NETWORK, by Reto Kramer, et al., filed on Mar. 17, 2006;

U.S. patent application Ser. No. 11/384,056, entitled SYSTEM AND METHOD FOR A GATEKEEPER IN A COMMUNICATIONS NETWORK, by Reto Kramer, et al., filed on Mar. 17, 2006;

U.S. Provisional Patent Application No. 60/800,949 entitled DIAMETER PROTOCOL AN SH INTERFACE SUPPORT FOR SIP SERVER ARCHITECTURE by Anno Langen, et al., filed on May 17, 2006;

U.S. Provisional Patent Application No. 60/800,091 entitled SIP AND HTTP CONVERGENCE IN NETWORK COMPUTING ENVIRONMENTS, by Anno Langen, et al., filed on May 16, 2006;

U.S. Provisional Patent Application No. 60/800,943 entitled HITLESS APPLICATION UPGRADE FOR SIP SERVER ARCHITECTURE, by Anon Langen, et al., filed on May 16, 2006;

U.S. Provisional Patent Application No. 60/801,083 entitled ENGINE NEAR CACHE FOR REDUCING LATENCY IN A TELECOMMUNICATIONS ENVIRONMENT, by Anno Langen, et al., filed on May 16, 2006;

U.S. patent application Ser. No. 11/434,024 entitled SYSTEM AND METHOD FOR CONTROLLING ACCESS TO LEGACY PUSH PROTOCOLS BASED UPON A POLICY, by Bengt-Inge Jakobsson, et al., filed on May 15, 2006;

U.S. patent application Ser. No. 11/434,010 entitled SYSTEM AND METHOD FOR CONTROLLING ACCESS TO LEGACY MULTIMEDIA MESSAGE PROTOCOLS BASED UPON A POLICY, by Andreas Jonsson, filed on May 15, 2006;

U.S. patent application Ser. No. 11/434,025 entitled SYSTEM AND METHOD FOR CONTROLLING ACCESS TO LEGACY SHORT MESSAGE PEER-TO-PEER PROTOCOLS BASED UPON A POLICY, by Andreas Jansson, filed on May 15, 2006 and U.S. patent application Ser. No. 11/434,934 entitled SYSTEM AND METHOD FOR SHAPING TRAFFIC, by Jan Svensson, filed on May 12, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to managing telecommunications and more particularly to a mechanism for controlling data flow based on a temporal policy.

BACKGROUND

Conventionally, telecommunications and network infrastructure providers have relied on often decades old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" IP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be too complex and too rigid to allow the creation and deployment of new service offerings.

DETAILED DESCRIPTION

Figure 1A:
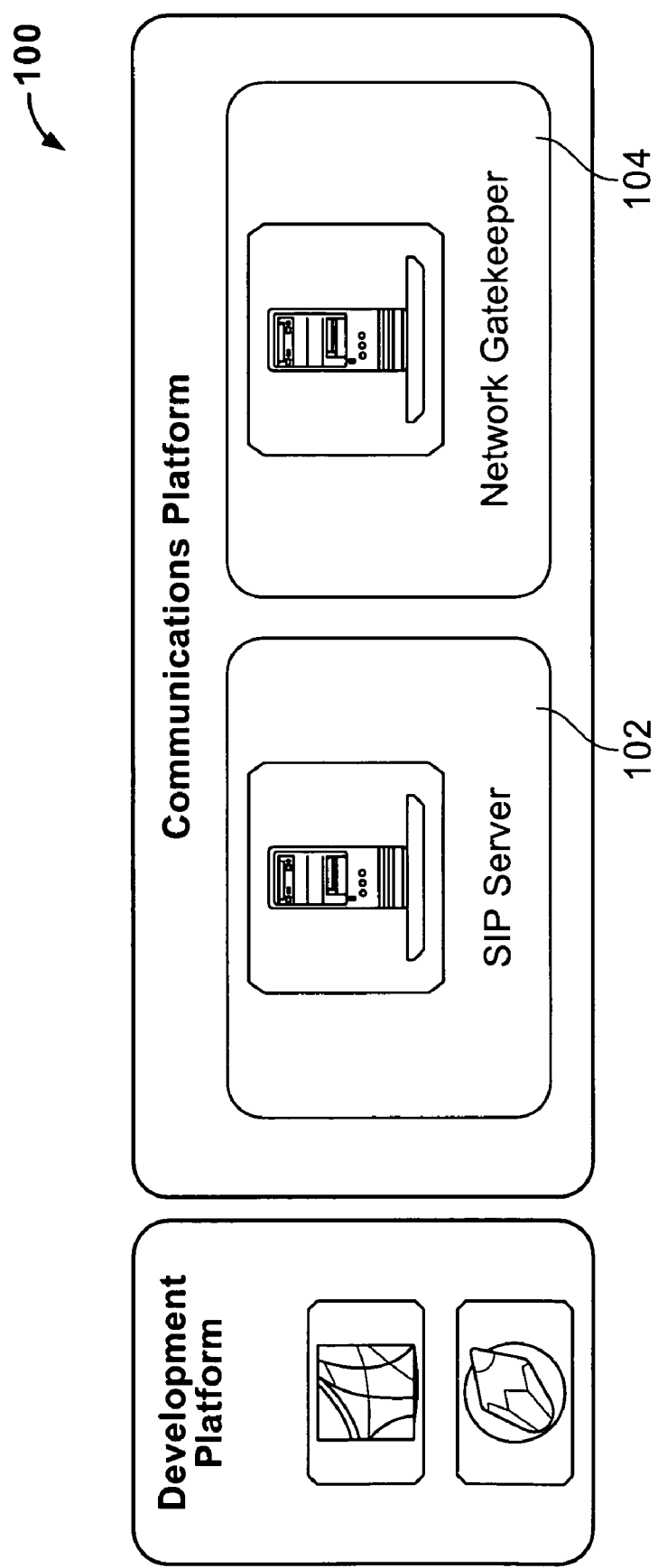
FIGS. 1A-1B are illustrations of an example communications platform that can be used to control access to legacy push protocols based upon a policy in an embodiment.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for controlling data flow based on a temporal policy. These mechanisms and methods for controlling data flow based on a temporal policy can enable embodiments to provide a different service level agreement to control network traffic selected from a plurality of service level agreements based upon one or more temporal conditions. The ability of embodiments to provide different service level agreement to control network traffic can enable embodiments to control one or more of access to network resources and traffic flow coordination to enhance efficient usage of the network resources.

In an embodiment and by way of example, a system is provided. The system embodiment includes a service capability Policy Enforcement Point (PEP) to receive at least one of a plurality of service requests from at least one application. A Policy Decision Point (PDP) selects from a plurality of different service level agreements, a service level agreement to control network traffic based upon at least one temporal condition to control at least one of access to network resources and traffic flow coordination based upon the selected service level agreement. A plug-in manager receives a decision from the PDP and provides at least one plug-in representing a network resource element to route requests permitted by the PDP.

As used herein, the terms service and web service are used interchangeably and are intended to be broadly construed to include any application, program or process resident on one or more computing devices capable of providing services to a requester or other recipient, including without limitation network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services. As used herein, the term application broadly includes any data entry, update, query or program that processes data on behalf of a user. Users may be human or computational entities.

As used herein, the term web services protocol is defined as a communications protocol that can be used for providing services between two or more applications over a network. Typical web services protocols include without limitation Short Message Peer-to-Peer protocol (SMPP) protocol, Push Application Protocol (PAP) protocol, Multimedia Messaging Services (MM7) protocol and Internet Message Access Protocol (IMAP) protocol. As used herein, the term legacy protocol is defined as a communications protocol implemented by existing applications or telecommunications systems. As used herein, the term policy is defined as a computational object including information for enforcing a limitation, a decision or otherwise causing a control point to take some action or refrain from taking some action. As used herein, the term shaping traffic is defined to mean maintaining or altering at least one of an amount, a rate, a bandwidth or any other characteristic of information flow over a channel.

FIG. 1A is an illustration of an example communications platform that can be used to controlling data flow based on a temporal policy in an embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

A SIP server 102 and a network gatekeeper 104 comprise a portfolio of product collectively comprise a communications platform 100. The SIP server 102 provides the communications platform 100 with a subsystem in which application components that interact with SIP-based networks may be deployed. The network gatekeeper 104 provides a policy-driven telecommunications Web services gateway that allows granular control over access to network resources from untrusted domains.

Figure 1B:
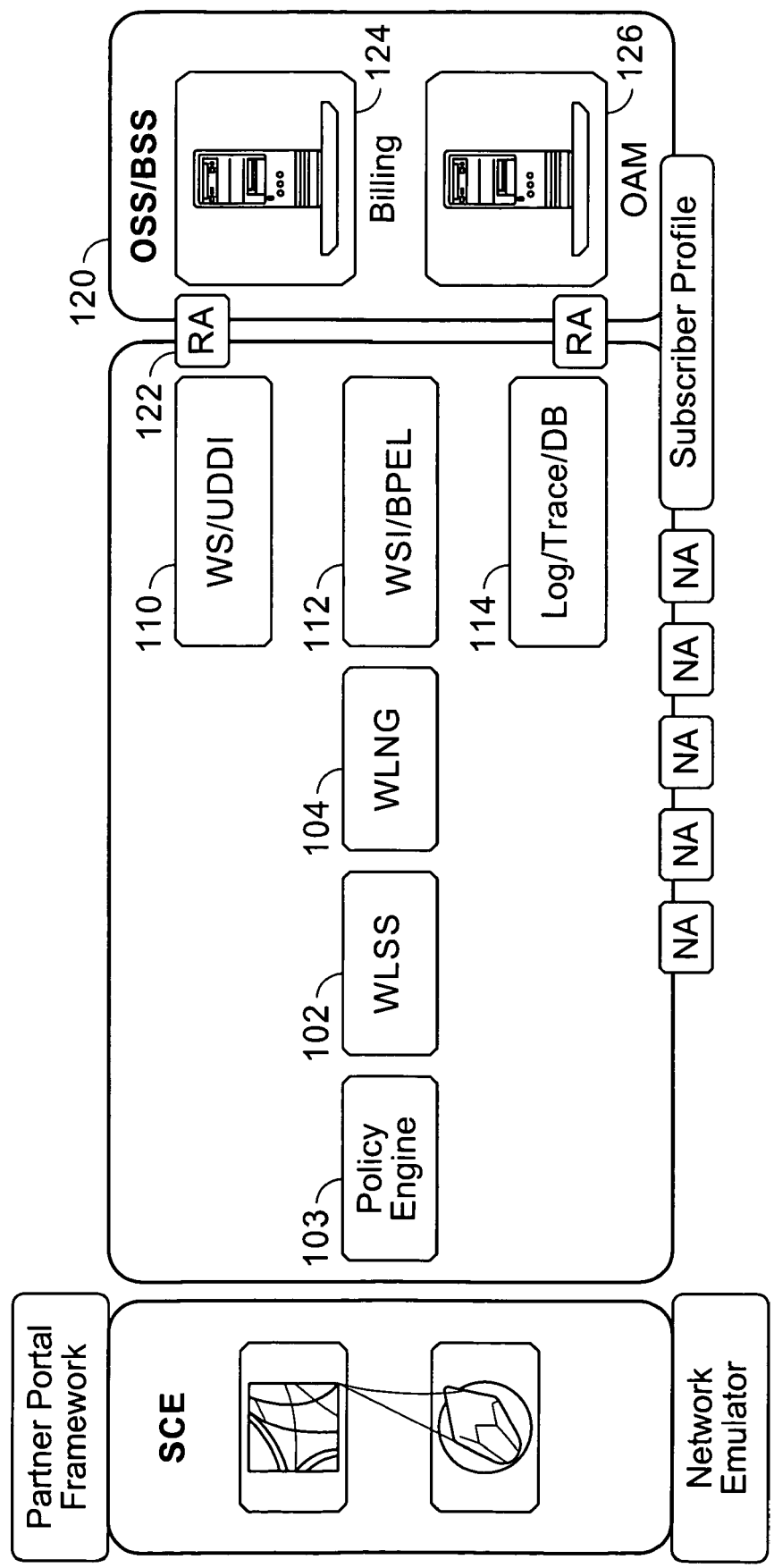

A variety of shared and re-usable software and service infrastructure components comprise the communications platform 100. For example, an application server, such as the WebLogic™ Application Server by BEA Systems, Inc. of San Jose, Calif. This application server may be augmented and adapted for deployment in telecommunications networks, while providing many features and functionality of the WebLogic™ Server counterpart widely deployed in enterprise computing environments. Application server embodiments for use in the telecommunications applications can provide a variety of additional features and functionality, such as without limitation:

Optimized for Peak Throughput
Clustering for Scalability and High-Performance
Generalized for wide range of target platforms (HW/OS) support
Extensive deployment configuration options
Optimized for local management
Plug and play Enterprise Information Systems (EIS) support Analogously, communications platform embodiments can provide a variety of additional features and functionality, such as without limitation:

Highly Deterministic Runtime Environment
Clustering for High-Availability (HA) and Scalability
Optimized for Telecom HW /OS /HAM W platforms support (SAF, ATCA, HA M /W, etc.)
Hardened configuration
Optimized for Telecom NMS integration
Telecommunications network connectors and interfaces FIG. 1B is another illustration of an example communications platform that can be used to controlling data flow based on a temporal policy in an embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Communications platform 100 comprises a Session Initiation Protocol (SIP) Server (WLSS) 102 and a Network Gatekeeper (WLNG) 104. Tools for interacting with Web Services, such as a Web Service—Universal Description Discovery Interface (WS/UDDI) 110, a Web Service—Business Process Execution Language (WS/BPEL) 112 may be coupled to the SIP Server 102 and the Network Gatekeeper 104 in embodiments. A log/trace and database 114 can assist with troubleshooting. In some deployments, the communications platform 100 can interface with processes that monitor underlying network function, such as Operations Support Systems/Business Support Systems (OSS/BSS) system 120 via RA protocol adapters 122. (RA protocol is a protocol for submission of billing information that are maintained in the network gatekeeper 104 and sent to a carrier's existing billing infrastructure.) Embodiments can include one or more of the following services OSS/BSS services. For example and without limitation, Operations Support Systems services can include activation, service assurance, usage/metering and provisioning, including designing, assigning and inventory. Business Support Systems can include billing, including invoicing, rating, taxation, and collections 124, customer management, including order entry, customer self services, customer care, trouble ticketing, and customer relation ship management. Such interfaces can provide access to Operation, Administration, and Maintenance (OAM) applications 126 and others. A policy engine 103 controls access by one or more third party services (not shown) and services (not shown) to resource elements (not shown) in a network layer.

A Service Creation Environment (SCE) enables service providers to create applications using a higher level programming abstraction tool to expedite application creation. Other types of tools may be provided in embodiments to enable internal staff who are not necessarily software engineers (e.g. business analysts, IT/MIS staff) but are programmers or have programming skills (e.g. internal software engineers with knowledge of the carrier's network etc. but perhaps less savvy as high power J2EE software engineers) to be able to create or modify applications.

A communications platform embodiment can provide an open, high performance, software based fault-tolerant platform that allows operators to maximize revenue potential by shortening time to market and significantly reducing per-service implementation and integration cost and complexity. The communications platform is suitable for use by for network infrastructure vendors, network operators and communications service providers in multiple deployment scenarios ranging from fully IP multi-media subsystem (IMS) oriented network architectures to hybrid and highly heterogeneous network architectures. It is not restricted to use only in carrier networks, however, and may be deployed in Enterprise communications networks without restriction or extensive customization. When deployed in conjunction with an IP multi-media subsystem, the communications platform can serve in the role of an IMS SIP application server and offers communications service providers an execution environment in which to host applications (such as the WebLogic™ Network Gatekeeper), components and standard service enablers. The following diagrams illustrate example network gatekeeper embodiments in telecommunications systems.

Figure 2A:
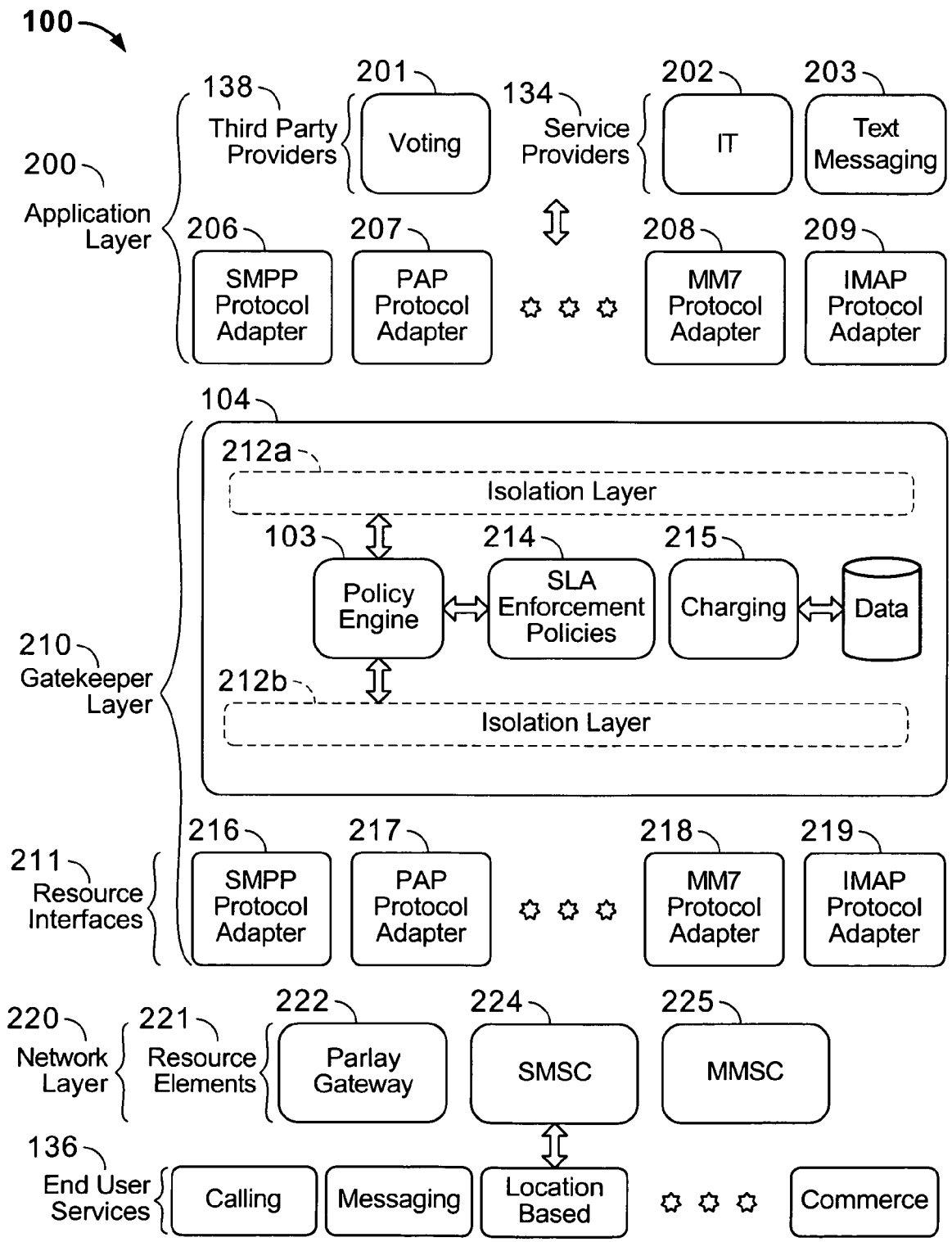
FIGS. 2A-2B are illustrations of example functional aspects of a communications platform embodiment.

FIG. 2A in an illustration of example functional aspects of a communications platform embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated by FIG. 2A and by way of example, an embodiment of a communications platform 100 provides an easy to use, integrated, configuration-driven intermediary between service providers 134, third party service providers 138 and end users 136. The communications platform 100 embodiment illustrated by FIG. 2A comprises an application layer 200 with interfaces to applications of the service providers 134 and third party service providers 138 and a network layer 220 to interface with the end users 136 via one or more network resource elements 221. Communications platform 100 further comprises a gatekeeper layer 210 interposed between the application layer 200 and the network layer 220 for managing and controlling information flowing between layers 200 and 220.

At the application layer 200, third party service providers 138 and service providers 134 are provided protocol adapters 206-209 to make services 201-203 available to callers over a network via the gatekeeper layer 210 provided by the communications platform 100. Access to network resource elements 221 by services 201, 202, 203 may be achieved using one or more web services protocol adapters 206-209. The protocol adapters 206-209 provide an interface mechanism, enabling the network gatekeeper 104 to intercept protocol communications from services 201-203 and control access to network resource elements by the services 201-203 in accordance with one or more policies. While illustrated here with reference to an embodiment having adapters to specific protocols, including without limitation, a Short Message Peer-to-Peer protocol (SMPP) protocol adapter 206, a Push Application Protocol (PAP) protocol adapter 207, a Multimedia Messaging Services (MM7) protocol adapter 208 and an Internet Message Access Protocol (IMAP) protocol adapter 209, embodiments may include any number or kind of protocols and are neither limited to, nor required to possess, these illustrated protocol adapters.

The gatekeeper layer 210 includes a gatekeeper 104 that comprises a plurality of functional elements working in concert to control access to network resource elements 221 at the network layer 220 by services 201-203 according to one or more policies. In an embodiment, a service level agreement (SLA) 214 comprises one or more policies governing access to the network layer 220. A policy engine 103 provides enforcement of the service level agreements. Service level agreements specify, e.g., how many messages customer A sends an hour, and if over a contract limit, customer A starts paying more, and so forth. In one embodiment, capabilities to create, customize, and execute service level agreement provisions as policies are provided. A charging mechanism 215 determines charges to callers for making a call using network resource elements 221, e.g., determine charges for network traffic (i.e., calls) according to charging information payment amount/schedule, priorities, and the like. Charging mechanism 215 may access data including Call Data Records (CDR) and/or Event Data Records (EDR) in order to determine charges. In one embodiment, the charging mechanism 215 determines an allocation of charges to be apportioned to the third party providing the service. As shown by the dotted lines in FIG. 2A, the actions of the policy engine 103 and other functional elements of the gatekeeper 104 provide virtual isolation layers 212*a*, 212*b* between services 201-203 at the application layer 200 and network resource elements 221 at the network layer 220. The isolation layers 212*a*, 212*b* indicate that the gatekeeper layer 210 functional elements can be isolated from, and unaffected by, the particulars of protocols, interfaces and the like used by applications, services and callers communicating using the network via the gatekeeper 104.

The gatekeeper layer 210 may include one or more resource interfaces 211 to interface with legacy protocols 216-218 or other web services protocols 219 as a mechanism to reach callers and end user applications (clients) via the network layer 220. While illustrated here with reference having resource interfaces to specific protocols, including without limitation, an SMPP protocol adapter 216, a PAP protocol adapter 217, an MM7 protocol adapter 218 and an IMAP protocol adapter 219, embodiments may include any number or kind of protocols and are neither limited to, nor required to possess, these illustrated resource interfaces. An extension toolkit (not shown) enables partners to develop resource interfaces for other protocols to include into the gatekeeper layer 210.

Network layer 220 includes one or more resource elements 221 such as without limitation a Parlay (protocol) gateway 222, an IMS (IP multi-media subsystem) 223, an SMSCs (short-message-service-center) 224 and MMSCs (multi-media messaging service center) 225, each of which provides a mechanism for moving information through the network to one or more end user services 136.

Figure 2B:
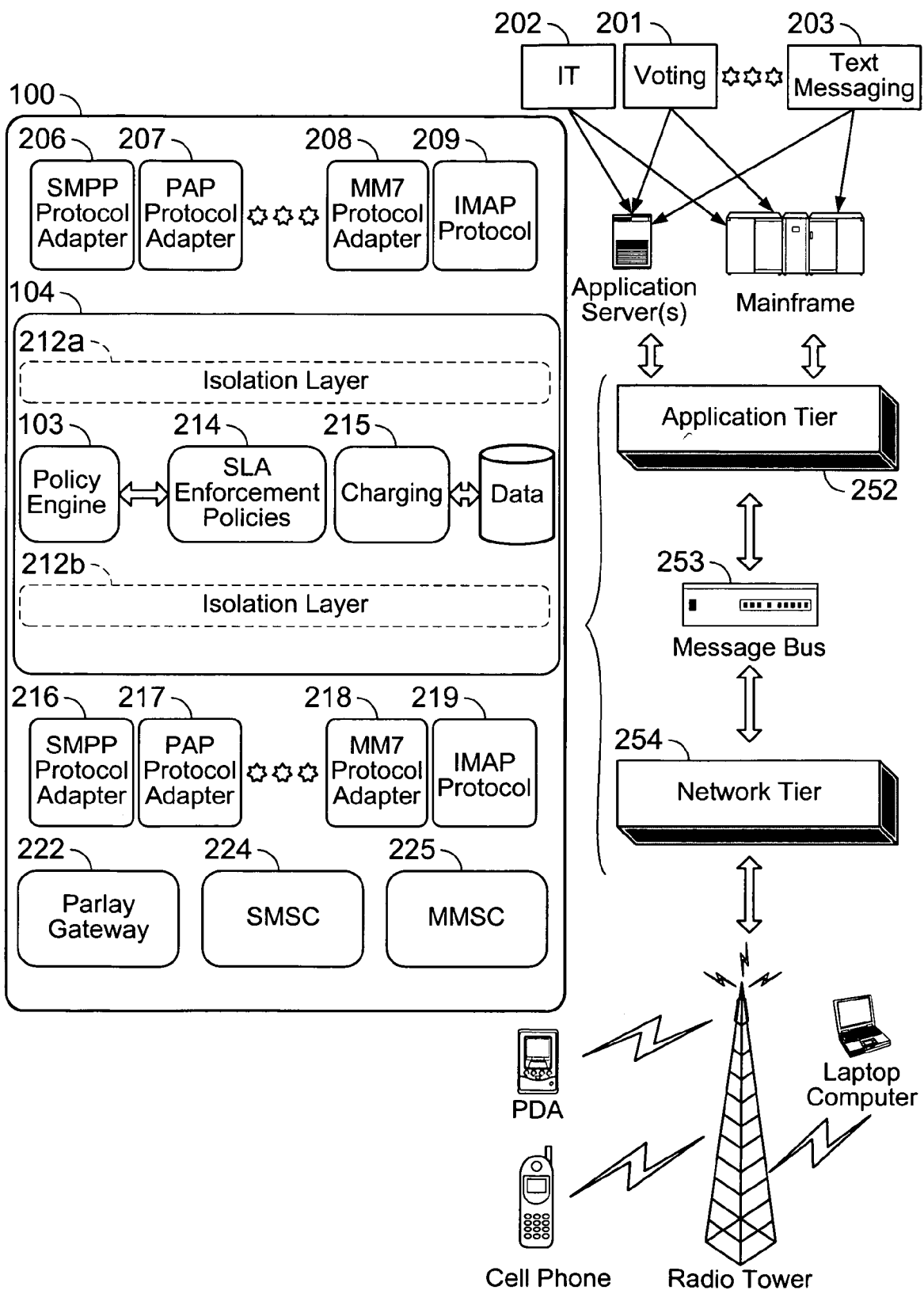

FIG. 2B is functional block diagram that shows a high level overview of an example logical architecture in which techniques for managing services in a communications network may be embodied. By way of example and as illustrated by FIG. 2B, communications platform 100 of FIG. 2A may be implemented using multi-tier system architecture. As shown in FIG. 2B, an example multi-tier system architecture provides independent, coordinated execution of business logic implementing services and the like, executing in one tier, and communications connection management logic which executes in a second tier. An application tier 252 comprises machines capable of executing applications, including applications provided by third parties, on behalf of callers that initiate communications sessions managed by the network tier 254. In an embodiment, an interconnection mechanism 253 provides an interconnection between network elements of application tier 252 and network tier 254. In an example embodiment, interconnection mechanism 253 comprises Java Messaging Service (JMS). In an alternate embodiment, interconnection mechanism 253 is implemented using Common Object Request Broker Architecture (CORBA), a group of application programming interfaces (APIs), communication protocols, and object/service information models to enable heterogeneous applications written in various languages running on various platforms to interoperate.

Figure 3:
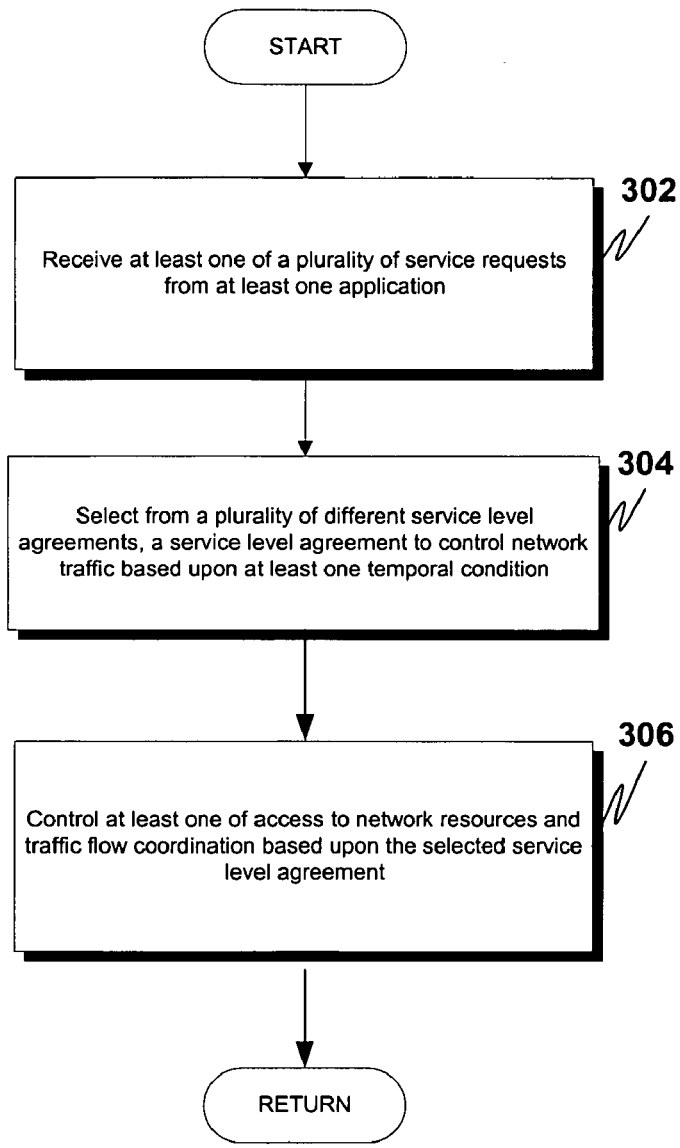
FIG. 3 is an operational flow diagram illustrating a high level overview of a technique for controlling data flow based on a temporal policy in an embodiment.

FIG. 3 is an operational flow diagram illustrating a high level overview of a technique for controlling data flow based on a temporal policy in an embodiment. The technique for shaping traffic shown in FIG. 3 is operable with an application provided by a third party provider, such as applications 201 of FIG. 2A and applications provided by service providers, such as applications 202-203 of FIG. 2A, for example. As shown in FIG. 3, at least one of a plurality of service requests is received from at least one application (block 302). For example and without limitation, this can include requesting a network plug-in from the plug-in manager to handle the request. Then, a service level agreement to control network traffic based upon at least one temporal condition is selected from a plurality of different service level agreements (block 304). By way of example and without limitation, this can include selecting from a plurality of different service level agreements, a service level agreement to control network traffic based upon at least one temporal condition selected from a time of day and a day of the week to control at least one of access to network resources and traffic flow coordination based upon the selected service level agreement. At least one of access to network resources and traffic flow coordination is controlled based upon the selected service level agreement (block 306). In embodiments, controlling at least one of access to network resources and traffic flow coordination can include providing, responsive to a decision to route the traffic, at least one plug-in representing a network resource element to route requests permitted by the PDP selected from at least one of an SMPP protocol adapter, a PAP protocol adapter, an MM7 protocol adapter and an IMAP protocol adapter, for example.

Figure 4:
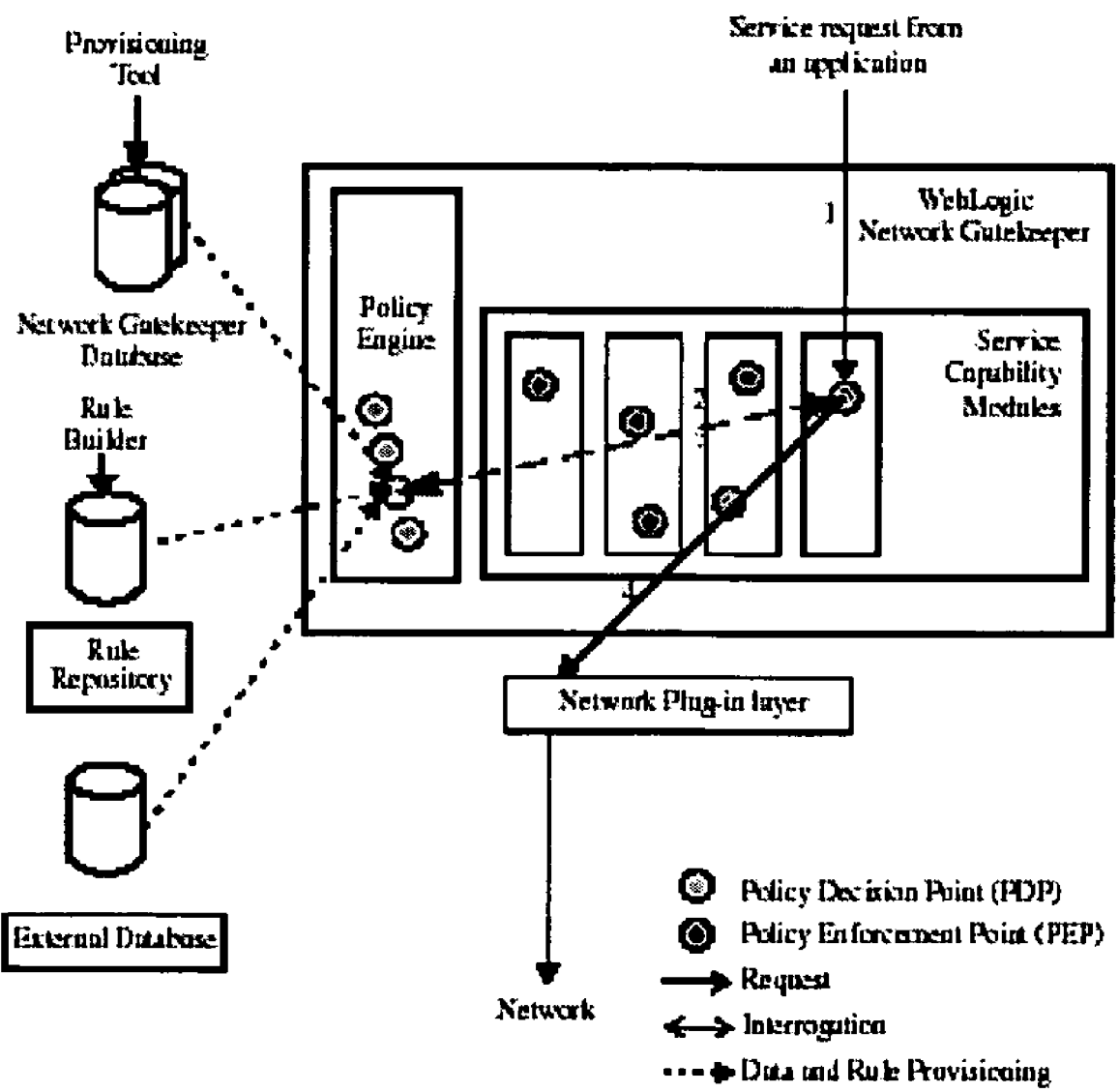
FIG. 4 illustrates an overview of service capability level policy execution in an embodiment.

FIG. 4 illustrates an overview of service capability level policy execution in an embodiment. In the embodiment illustrated by FIG. 4, the policy rules are automatically loaded into a policy engine's working memory at start up. If rules are added or updated during runtime, they can be loaded into the policy engine using a Network Gatekeeper Management Tool. Policy decisions are triggered at Policy Enforcement Points (PEPs), which exist in both the service capability modules and the plug-in manager. The service capability module PEP forwards the data included in a request for access to the Policy Decision Point (PDP) in the policy engine for evaluation. Using the request data and the rule associated with the PEP, the PDP decides to allow or reject the request. The rule is then enforced at the PEP.

With reference to FIG. 4, an application sends (1) a service request to the Network Gatekeeper, which is passed to a service capability PEP. The PEP sends (2) the basic request to the PDP in the policy engine, where it is evaluated on the basis of: the rules, additional data from the Network Gatekeeper database, as needed and additional data from other external databases, as needed. The PDP informs (3) the PEP of its policy decision and returns the request data. The PDP may modify or add new data to the request before returning it, based on the rules. The service capability queries (4) the plug-in manager for the appropriate network plug-in.

Figure 5:
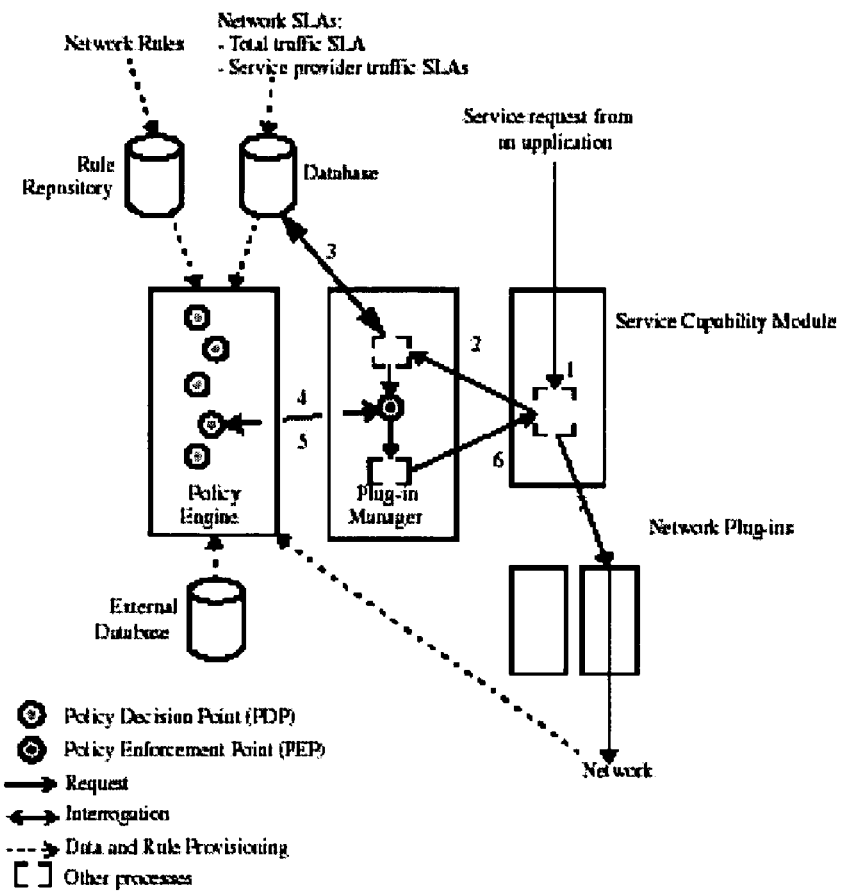
FIG. 5 illustrates an overview of Network level policy execution in an embodiment.

FIG. 5 illustrates an overview of Network level policy execution in an embodiment. In the embodiment illustrated by FIG. 5, the Policy Enforcement Point (PEP) in the plug-in manager is used to enforce network protection and network access control. The traffic flow is similar to that in the service capability flow. An application sends (1) a service request to the Gatekeeper, which is processed at the service capability level. The service capability module requests (2) a network plug-in from the plug-in manager to handle the request. The plug-in manager retrieves (3) a list of possible plug-ins based on the address plan and destination address indicated in the service request. The plug-in manager sends (4) the list of possible plug-ins and the service request data to the policy engine for a policy decision. The policy engine makes a decision based on: the request data, general network gatekeeping rules, specific data in the service provider traffic SLA, specific data in the total traffic SLA, and additional data provided by external databases or by the network node. The policy engine returns (5) a list of the plug-ins that have passed the policy decision. The plug-in manager is also informed if no plug-in has passed. The plug-in manager selects (6) a plug-in from the list and sends it to the service capability module. The service capability module routes (7) the service request to the selected plug-in.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a non-transitory storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for controlling data flow based on a temporal policy as discussed herein.

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Embodiments can provide, by way of example and without limitation, services such as:

VoIP services, including, without limitation the following features:

Basic features. These include standards services such as Voice mail, Caller ID, Call waiting, and call forwarding (the ability to forward a call to a different number).

Advanced features. The list of advanced features is operators specific. Following is a brief list of advanced features:

Call logs: The ability to view calls made over a given period of time online, ability to associate names with phone numbers, integrate call log information to other applications such as IM.

Do not disturb: The ability to specify policies around receiving calls—for example, all calls during office hours to be automatically forwarded to a mobile terminal, all calls during the night to be directed to voice mail etc.

Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.

Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.

Lifetime number: This is the facility where a single virtual number can travel with a customer wherever they live. Even if they move, the old number continues to work, and reaches them at their new location. This is really the analog of static IP addresses in a phone network.

Speed dial: This is the ability to dramatically expand the list of numbers that can be dialed through short-key and accelerator combinations. This is another example of a converged application, since it's very likely that when a user will set up this information when they work through the call logs on the operator user portal, and the updated information needs to be propagated to the network side in real-time.

Media delivery services, including, without limitation the following features:

Depending on the service level agreement users are willing to sign up to, the quality of media delivered (e.g. # of frames per second) will vary. The policy engine enables segmenting the customer base by revenue potential, and to maximize return on investment made in the network.

Context-sensitive applications including, without limitation the following features:

A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:

The final class of applications is one that combines wireline and wireless terminal usage scenarios. An example of an integrated application is the following: a mobile terminal user is on a conference call on their way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

The invention claimed is:

1. A telecommunications system comprising:
    one or more processors and a non-transitory storage medium containing instructions, which when executed by the one or more processors, cause the one or more processors to implement:
    a service capability module, residing on the non-transitory storage medium, that receives a request from an application that resides in an untrusted domain, said request being directed to a subscriber device in a telecommunications network;
    a plug-in manager that retrieves one or more plug-ins to handle the request, wherein each of the one or more plug-ins represents a particular network device in the telecommunications network, device including at least one of the following: a short messaging service center (SMS-C), a multimedia messaging service center (MMS-C), and a parlay gateway of the telecommunications network;
    a first Policy Enforcement Point (PEP) residing on the service capability module to enforce service capabilities, wherein the first PEP determines whether to grant to deny the request according to a service being invoked by the request and according to at least one temporal condition;
    a second PEP residing on the plug-in manager to enforce network protection by coordinating traffic among the network devices to enhance network traffic efficiency, wherein the second PEP routes the request to a selected network device;
    a policy engine containing a set of policy rules loaded into memory of said policy engine, wherein the policy rules can be added and updated at runtime;
    a Policy Decision Point (PDP) residing on the policy engine, wherein said PDP makes a policy decision by employing the set of policy rules;
    wherein upon receiving the request from the application, the first PEP forwards data in the request to the PDP in the policy engine that evaluates the request, modifies or adds new data to the request, and informs the first PEP of the policy decision, wherein the first PEP then enforces said policy decision on the request and queries the plug-in manager for a list of possible plug-ins to handle the request; and
    wherein upon receiving the request from the first PEP, the plug-in manager retrieves the list of possible plug-ins based on an address plan and destination address of the request and sends the list of possible plug-ins to the policy engine,
    wherein the policy engine makes a decision based on one or more of: request data, general network gatekeeping rules, specific data in the service provider traffic service level agreement (SLA) or additional data from external databases,
    wherein the policy engine returns the list of possible plug-ins that have passed the decision to the plug-in manager or informs the plug-in manager that no plug-in has passed the decision, wherein the plug-in manager selects a plug-in from the list of possible plug-ins and sends the plug-in to the service capability module, and
    wherein the service capability module routes the request to said plug-in.

2. The telecommunications system of claim 1, wherein the policy engine selects from a plurality of different service level agreements, a service level agreement to control network traffic based upon said at least one temporal condition to control at least one of access to network resources and traffic flow coordination based upon the selected service level agreement.

3. The telecommunications system of claim 1, wherein the plug-in includes at least one of an SMPP protocol adapter, a PDP protocol adapter, and MM7 protocol adapter.

4. The telecommunications system of claim 1, wherein the Policy Decision Point (PDP) selects from a plurality of different service level agreements, the service level agreement to control network traffic based upon said at least one temporal condition selected from a time of day and a day of the week to control at least one of access to network resources and traffic flow coordination based upon the selected service level agreement.

5. A method for controlling data flow based on a temporal policy in a telecommunications environment, the method comprising:
    receiving at least one of a plurality of service requests from at least one application that resides in an untrusted domain to a service capability module on a computing device, said request being directed to a subscriber device in a telecommunications network;
    providing a plug-in manager that retrieves one or more plug-ins to handle the service requests, wherein the one or more plug-ins establish a connection with network devices over a particular communications protocol, the network devices including at least one of the following: a short messaging service center (SMS-C), a multimedia messaging service center (MMS-C) and a parlay gateway of a telecommunications network;
    providing a first Policy Enforcement Point (PEP) residing on the service capability module to enforce service capabilities, wherein the first PEP determines whether to grant to deny the request according to a service being invoked by the request and according to at least one temporal condition;
    providing a second PEP residing on the plug-in manager to enforce network protection by coordinating traffic among the network devices to enhance network traffic efficiency, wherein the second PEP routes the request to a selected network device;

providing a policy engine containing a set of policy rules loaded into memory of said policy engine, wherein the policy rules can be added and updated at runtime; and employing the policy rules by a policy decision point residing on the policy engine in order to control traffic flow based upon at least one temporal condition;

wherein upon receiving the request from the application, the first PEP forwards data in the request to the PDP in the policy engine that evaluates the request, modifies or adds new data to the request, and informs the first PEP of the policy decision, wherein the first PEP then enforces said policy decision on the request and queries the plug-in manager for a list of possible plug-ins to handle the request; and wherein upon receiving the request from the first PEP, the plug-in manager retrieves the list of possible plug-ins based on an address plan and destination address of the request and sends the list of possible plug-ins to the policy engine, wherein the policy engine makes a decision based on one or more of request data, general network gatekeeping rules, specific data in the service provider traffic service level agreement (SLA) or additional data from external databases, wherein the policy engine returns the list of possible plug-ins that have passed the decision to the plug-in manager or informs the plug-in manager that no plug-in has passed the decision, wherein the plug-in manager selects a plug-in from the list of possible plug-ins and sends the plug-in to the service capability module, and wherein the service capability module routes the request to said plug-in.

6. The method of claim 5, wherein making a policy decision further includes: selecting from a plurality of different service level agreements, a service level agreement to control network traffic based upon said at least one temporal condition selected from a time of day and a day of the week to control at least one of access to network resources and traffic flow coordination based upon the selected service level agreement.

7. The method of claim 5, wherein the plug-in includes one or more of: an SMPP protocol adapter, a PDP protocol adapter, and MM7 protocol adapter and an IMAP protocol adapter.

8. A non-transitory computer-readable storage medium storing one or more sequences of instructions for controlling data flow based on a temporal policy in a telecommunications environment, wherein execution of said instructions causes one or more processors to carry out the steps of:

receiving at least one of a plurality of service requests from at least one application that resides in an untrusted domain to a service capability module residing on the non-transitory computer-readable storage medium, said request being directed to a subscriber device in a telecommunications network;

providing a plug-in manager that retrieves one or more plug-ins to handle the service requests, wherein the one or more plug-ins establish a connection with network devices over a particular communications protocol, the network devices including at least one of the following: a short messaging service center (SMS-C), a multimedia messaging service center (MMS-C) and a parlay gateway of a telecommunications network;

providing a first Policy Enforcement Point (PEP) residing on the service capability module to enforce service capabilities, wherein the first PEP determines whether to grant to deny the request according to a service being invoked by the request and according to at least one temporal condition;

providing a second PEP residing on the plug-in manager to enforce network protection by coordinating traffic among the network devices to enhance network traffic efficiency, wherein the second PEP routes the request to a selected network device;

providing a policy engine containing a set of policy rules loaded into memory of said policy engine, wherein the policy rules can be added and updated at runtime; and employing the policy rules by a policy decision point residing on the policy engine in order to control traffic flow based upon at least one temporal condition;

wherein upon receiving the request from the application, the first PEP forwards data in the request to the PDP in the policy engine that evaluates the request, modifies or adds new data to the request, and informs the first PEP of the policy decision, wherein the first PEP then enforces said policy decision on the request and queries the plug-in manager for a list of possible plug-ins to handle the request; and wherein upon receiving the request from the first PEP, the plug-in manager retrieves the list of possible plug-ins based on an address plan and destination address of the request and sends the list of possible plug-ins to the policy engine, wherein the policy engine makes a decision based on one or more of request data, general network gatekeeping rules, specific data in the service provider traffic service level agreement (SLA) or additional data from external databases, wherein the policy engine returns the list of possible plug-ins that have passed the decision to the plug-in manager or informs the plug-in manager that no plug-in has passed the decision, wherein the plug-in manager selects a plug-in from the list of possible plug-ins and sends the plug-in to the service capability module, and wherein the service capability module routes the request to said plug-in.

\* \* \* \* \*

UNITED STATES PATENT AND TRADEMARK OFFICE
CERTIFICATE OF CORRECTION

PATENT NO. : 7,953,877 B2
APPLICATION NO. : 11/434022
DATED : May 31, 2011
INVENTOR(S) : Vemula et al.

Page 1 of 1

It is certified that error appears in the above-identified patent and that said Letters Patent is hereby corrected as shown below:

On Title page, in column 1, under "Title", line 2, delete "UPON" and insert -- ON --, therefor.

In column 1, line 2, delete "UPON" and insert -- ON --, therefor.

In column 1, line 21, delete "AN" and insert -- AND --, therefor.

In column 1, line 30, delete "Anon" and insert -- Anno --, therefor.

In column 1, line 43, delete "Jonsson," and insert -- Jansson, --, therefor.

In column 5, line 22, delete "relation ship" and insert -- relationship --, therefor.

Signed and Sealed this
Twenty-second Day of November, 2011

David J. Kappos
*Director of the United States Patent and Trademark Office*